(12) United States Patent
Nukushina et al.

(10) Patent No.: US 12,438,787 B2
(45) Date of Patent: Oct. 7, 2025

(54) ANALYSIS DEVICE, ANALYSIS SYSTEM, ANALYSIS METHOD, AND ANALYSIS PROGRAM

(71) Applicant: NTT, INC., Tokyo (JP)

(72) Inventors: Takahiro Nukushina, Musashino (JP); Iifan Tyou, Musashino (JP); Yukio Nagafuchi, Musashino (JP); Takaaki Koyama, Musashino (JP)

(73) Assignee: NTT, Inc., Tokyo (JP)

( * ) Notice: Subject to any disclaimer, the term of this patent is extended or adjusted under 35 U.S.C. 154(b) by 47 days.

(21) Appl. No.: 18/276,644

(22) PCT Filed: Feb. 18, 2021

(86) PCT No.: PCT/JP2021/006186
§ 371 (c)(1),
(2) Date: Aug. 10, 2023

(87) PCT Pub. No.: WO2022/176128
PCT Pub. Date: Aug. 25, 2022

(65) Prior Publication Data
US 2024/0129202 A1 Apr. 18, 2024

(51) Int. Cl.
*H04L 41/16* (2022.01)
*H04L 43/0876* (2022.01)

(52) U.S. Cl.
CPC .......... *H04L 41/16* (2013.01); *H04L 43/0876* (2013.01)

(58) Field of Classification Search
CPC ............................ H04L 41/16; H04L 43/0876
USPC ........................................................ 709/224
See application file for complete search history.

(56) References Cited

U.S. PATENT DOCUMENTS

| | | | |
|---|---|---|---|
| 2016/0381030 A1* | 12/2016 | Chillappa | H04W 4/38 726/11 |
| 2019/0132205 A1* | 5/2019 | Du | H04L 41/069 |
| 2021/0234863 A1 | 7/2021 | Tyou et al. | |

FOREIGN PATENT DOCUMENTS

JP 2019-213103 A 12/2019

* cited by examiner

Primary Examiner — Hermon Asres
(74) Attorney, Agent, or Firm — XSENSUS LLP

(57) ABSTRACT

An analysis device includes processing circuitry configured to acquire, from each network traffic sensor that monitors communication of an Internet of Things (IoT) device, a normal communication model that is used for monitoring the communication and indicates a characteristic of normal communication of the IoT device, cluster a normal communication model group of a same feature among acquired normal communication model groups, calculate a majority cluster that is a cluster having a largest number of normal communication models by using a result of the clustering, and calculate an average model of the normal communication model group belonging to the majority cluster, and notify the network traffic sensor serving as an acquisition source of the normal communication model of attribution information indicating whether or not the normal communication model belongs to the majority cluster and the average model.

7 Claims, 12 Drawing Sheets

ANALYSIS DEVICE, ANALYSIS SYSTEM, ANALYSIS METHOD, AND ANALYSIS PROGRAM

CROSS-REFERENCE TO RELATED APPLICATION

The present application is based on PCT filing PCT/JP2021/006186, filed Feb. 18, 2021, the entire contents of which are incorporated herein by reference.

TECHNICAL FIELD

The present invention relates to an analysis device, an analysis system, an analysis method, and an analysis program.

BACKGROUND ART

There has been conventionally proposed a technique for detecting abnormality in communication of Internet of Things (IoT) devices. For example, a network traffic sensor (hereinafter, abbreviated as a sensor as appropriate) learns a normal communication model indicating normal communication by using the number of transmission packets, the number of destination IP addresses, and the like in communication from an IoT device as features. Then, the sensor uses the learned normal communication model to detect abnormal communication behavior caused by the IoT device infected with malware, for example.

In learning the normal communication model, various features during normal communication are learned for each model of a target IoT device by using a normal distribution. For example, the sensor starts learning a normal communication model by using the various features of communication of the IoT device and ends the learning of the normal communication model when determining that behavior of the communication is stable (see Patent Literature 1). Then, the sensor detects abnormality in communication of the IoT device by using the learned normal communication model.

CITATION LIST

Patent Literature

Patent Literature 1: Japanese Laid-open Patent Publication No. 2019-213103 A

SUMMARY OF INVENTION

Technical Problem

Conventionally, when detecting abnormality in communication of an IoT device on the basis of a normal communication model, a sensor examines information of a detection alert. Then, when the detected communication is found to be normal communication, an administrator or the like of the sensor updates the normal communication model in order to prevent recurrence of over-detection.

At that time, it may be difficult for the administrator to determine whether to update the normal communication model only on the basis of the information of the detection alert. Therefore, the administrator cannot appropriately update the normal communication model, and over-detection may occur again.

In the related art, among features of communication data, a feature whose temporal increase/decrease is stable can be used to learn a normal communication model. However, even if the feature can be originally used to learn the normal communication model, when behavior of communication temporarily changes due to intervention of a user operation or the like during a learning period, the normal communication model cannot be learned. In this case, it is necessary to, for example, exclude the feature from a target to be monitored or relearn the normal communication model.

For those problems, for example, there are some improvement methods such as extending a learning time of the normal communication model or observing as many communication behaviors as possible at the time of learning the normal communication model. However, the above methods have a higher possibility of learning also an abnormal communication behavior. There is also a problem that a machine load increases with learning processing.

In view of this, an object of the present invention is to solve the above problems and to support application of an appropriate normal communication model to a sensor.

Solution to Problem

In order to solve the above problems, the analysis device includes: processing circuitry configured to: acquire, from each network traffic sensor that monitors communication of an Internet of Things (IoT) device, a normal communication model that is used for monitoring the communication and indicates a characteristic of normal communication of the IoT device; cluster a normal communication model group of a same feature among acquired normal communication model groups, calculate a majority cluster that is a cluster having a largest number of normal communication models by using a result of the clustering, and calculate an average model of the normal communication model group belonging to the majority cluster; and notify the network traffic sensor serving as an acquisition source of the normal communication model of attribution information indicating whether or not the normal communication model belongs to the majority cluster and the average model.

Advantageous Effects of Invention

According to the present invention, it is possible to support application of an appropriate normal communication model to a sensor.

DESCRIPTION OF EMBODIMENTS

Hereinafter, modes for carrying out the present invention (embodiments) will be described with reference to the drawings. The present invention is not limited to the embodiments described below.

[Overview] First, an overview of an analysis system including an analysis device (server) of the present embodiment will be described with reference to FIG. 1. An analysis system (system) 1 includes a plurality of network traffic sensors (sensors) 20 and a server 100.

Each of the sensors 20 includes a normal communication model indicating a characteristic of normal communication for each model and each feature of an Internet of Things (IoT) device. The feature used for the normal communication model includes, for example, the number of transmission packets per certain time period, the number of destination IP addresses, a port number, the number of bytes of packets, and the like in communication of the IoT device.

For example, the sensor 20 learns a normal communication model regarding each feature of communication for each model of the IoT device to be monitored and monitors whether or not the communication of the IoT device to be monitored is normal by using the learned normal communication model.

For example, the sensor 20 learns a normal communication model regarding the number of destination IPs (the number of destination IP addresses) in communication of an IoT device of a model A and monitors whether or not the communication of the IoT device of the model A is normal by using the learned normal communication model.

The server 100 acquires the normal communication model of the IoT device from each sensor 20. Then, the server 100 clusters the acquired normal communication model group such that similar normal communication models belong to the same cluster.

Figure 1:
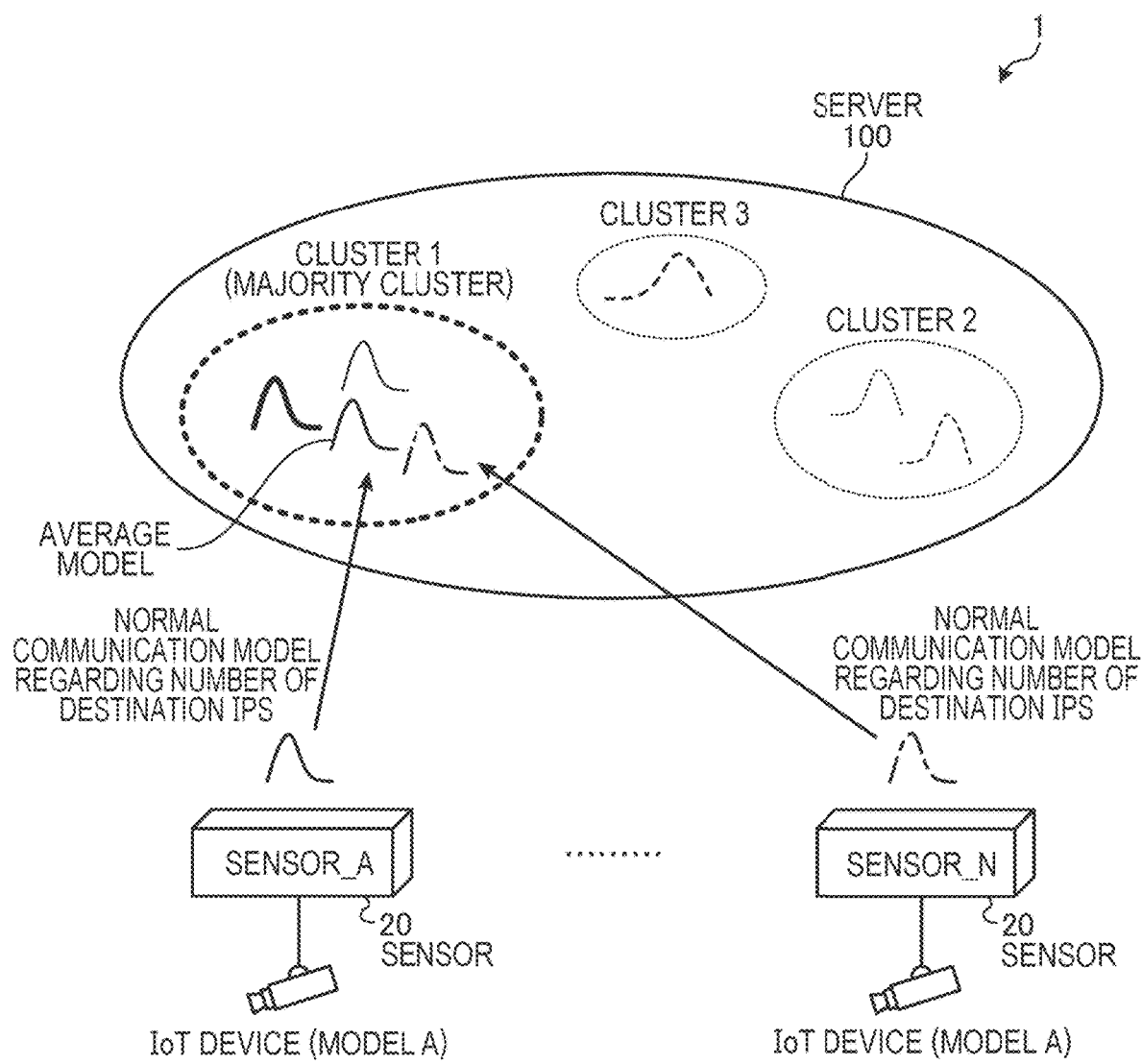
FIG. 1 is an explanatory diagram of an overview of a system including an analysis device (server) of the present embodiment.

For example, the server 100 clusters the acquired normal communication model group regarding the number of destination IPs of the IoT devices of the model A into clusters 1, 2, and 3 in FIG. 1. Then, among those clusters, the server 100 calculates a cluster (majority cluster) to which a group of the largest number of normal communication models belongs.

Thereafter, the server 100 notifies each sensor 20 serving as an acquisition source of the normal communication model whether or not the normal communication model acquired from the sensor 20 belongs to the majority cluster.

The server 100 also calculates an average model of the normal communication model group belonging to the majority cluster and notifies each sensor 20 of the calculated average model.

In this way, the server 100 can notify each sensor 20 whether or not the normal communication model held in the sensor 20 is appropriate. The server 100 can also notify each sensor 20 of an appropriate normal communication model.

Configuration Example

[Server] Next, a configuration example of the server 100 will be described with reference to FIG. 2. The server 100 includes a communication unit 110, a storage unit 120, and a control unit 130. The communication unit 110 is an interface for performing data communication with an external device (e.g. the sensor 20) via a network.

The storage unit 120 stores data to be referred to when the control unit 130 executes various kinds of processing and data generated by the control unit 130. For example, the storage unit 120 stores a normal communication model acquired from each sensor 20 and cluster information generated by the control unit 130 (information indicating a result of clustering a normal communication model group, a majority cluster, and the like). The storage unit 120 also stores, for example, information regarding a normal communication model applied by the sensor 20 for each sensor 20.

The control unit 130 controls the entire server 100. The control unit 130 includes an acquisition unit 131, a calculation unit 132, a determination unit 133, and a notification unit 134.

The acquisition unit 131 acquires, from the sensor 20, a normal communication model used in the sensor 20 for monitoring communication of the IoT device.

Figure 4:
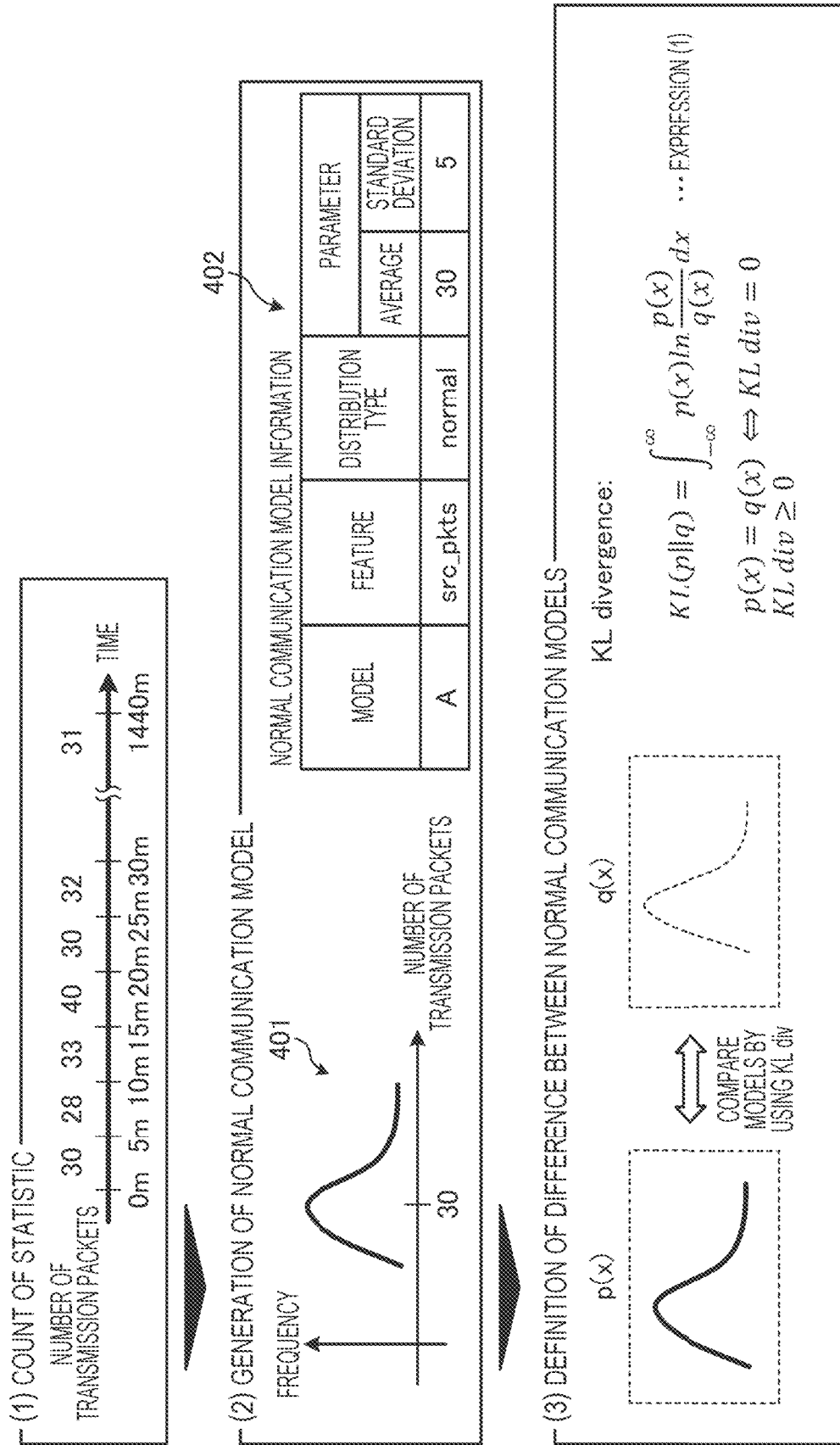
FIG. 4 is an explanatory diagram of generation of a normal communication model and definition of a difference between normal communication models.

The normal communication model indicates, for example, a statistical value of appearance frequency of the number of transmission packets per unit time in the IoT device, as indicated by the reference sign 401 in "(2) Generation of normal communication model" in FIG. 4.

The normal communication model may include, for example, information such as identification information of a model of the target IoT device, a feature (e.g. src_pkts (the number of transmission IP packets)) used to calculate the statistical values, a distribution type (e.g. normal (normal distribution)) of the statistical values, and parameters (e.g. average value and standard deviation), as indicated by the reference sign 402.

Figure 2:
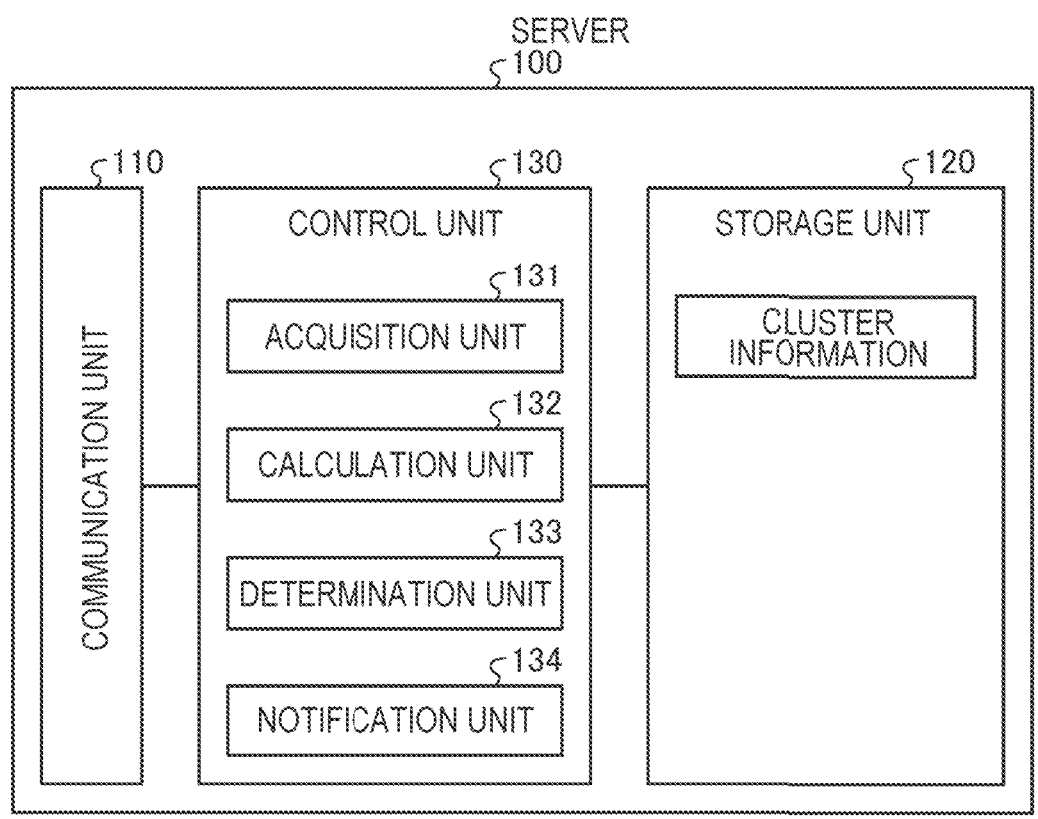
FIG. 2 illustrates a configuration example of a server.

The description returns to FIG. 2. Among the normal communication models acquired by the acquisition unit 131, the calculation unit 132 clusters a normal communication model group of the same model and the same feature. For example, when the acquisition unit 131 acquires a new normal communication model, the calculation unit 132 clusters a normal communication model group including the new normal communication model, the normal communication model group having the same model and the same feature as the new normal communication model.

Then, the calculation unit 132 calculates a majority cluster that is a cluster to which the largest number of normal communication models belong on the basis of a result of the clustering. The calculation unit 132 also calculates an average model of the normal communication model group belonging to the majority cluster. For example, the calculation unit 132 calculates, as the average model, a normal communication model corresponding to the center of gravity of the normal communication model group belonging to the majority cluster.

When clustering the normal communication model group, the calculation unit 132 uses KL divergence, for example. For example, as shown in "(3) Definition of difference between normal communication models" in FIG. 4, the calculation unit 132 compares a normal communication model p(x) and a normal communication model q(x) by using KL divergence (KL div. See Expression (1)). Then, the calculation unit 132 performs clustering such that a group of similar normal communication models belongs to the same cluster.

[Math. 1]
$$KL \text{ divergence: } KL(p\|q) = \int_{-\infty}^{\infty} p(x) \ln \frac{p(x)}{q(x)} dx \quad \text{Expression (1)}$$
$$p(x) = q(x) \Leftrightarrow KLdiv = 0$$
$$KLdiv \geq 0$$

In a case where the acquisition unit 131 acquires a normal communication model whose parameter has been updated from the sensor 20, the calculation unit 132 clusters again a normal communication model group including the normal communication model whose parameter has been updated, the normal communication model group having the same feature as the normal communication model. Then, the calculation unit 132 recalculates the majority cluster by using a result of the clustering. The calculation unit 132 also recalculates the average model of the normal communication model group belonging to the recalculated majority cluster.

The description returns to FIG. 2. The determination unit 133 determines whether or not the normal communication model acquired by the acquisition unit 131 belongs to the majority cluster calculated by the calculation unit 132. The notification unit 134 notifies the sensor 20 serving as an acquisition source of the normal communication model of information indicating a result of the determination by the determination unit 133 (attribution information to the majority cluster) and the average model of the normal communication model group belonging to the majority cluster calculated by the calculation unit 132.

In a case where the calculation unit 132 recalculates the majority cluster, the determination unit 133 determines whether or not the normal communication model acquired from each sensor 20 belongs to the recalculated majority cluster. Then, in a case where the determination unit 133 determines that any one of the normal communication models does not belong to the recalculated majority cluster, the notification unit 134 notifies the sensor 20 serving as an acquisition source of the normal communication model that the normal communication model is out of the majority cluster and also notifies the sensor 20 of the recalculated average model.

[Sensor] Next, a configuration example of the sensor 20 will be described with reference to FIG. 3. The sensor 20 includes a communication unit 21, a storage unit 22, and a control unit 23. The communication unit 21 is an interface for performing data communication with an external device (e.g. the IoT device or the server 100) via a network.

The storage unit 22 stores data to be referred to when the control unit 23 executes various kinds of processing and data generated by the control unit 23. For example, the storage unit 22 stores a normal communication model generated by the control unit 23 and an average model received from the server 100.

The control unit 23 includes a learning unit 231, a monitoring unit 232, a transmission/reception unit 233, a determination unit 234, and a model management unit 235.

The learning unit 231 learns a normal communication model on the basis of a feature (e.g. the number of transmission packets per certain time period, an IP address of a communication destination, a port number, or the number of bytes of packets) of communication data of the IoT device to be monitored acquired via the communication unit 21. The learned normal communication model is stored in the storage unit 22.

An example of learning a normal communication model will be described with reference to FIG. 4. For example, a case of learning (generating) a normal communication model regarding the number of transmission packets of the IoT device of the model A will be described.

First, the learning unit 231 counts a statistic of communication data of the IoT device of the model A ((1)). For example, the learning unit 231 counts the number of transmission packets for each certain time period of the IoT device of the model A.

Next, the learning unit 231 generates a normal communication model on the basis of the count result of the statistic of the communication data of the IoT device of the model A obtained in (1) ((2)). For example, the learning unit 231 obtains a statistical value of appearance frequency of the number of transmission packets per certain time period on the basis of the number of transmission packets for each certain time period of the IoT device of the model A obtained in (1) and generates the normal communication model indicated by reference signs 401 and 402.

In some cases, the learning unit 231 fails in learning the normal communication model. For example, when behavior of communication temporarily changes during a learning period of the normal communication model, the learning unit 231 cannot learn the normal communication model. That is, the learning unit 231 may fail in learning the normal communication model. In that case, the transmission/reception unit 233 notifies the server 100 that the sensor 20 has failed in learning the normal communication model.

Figure 3:
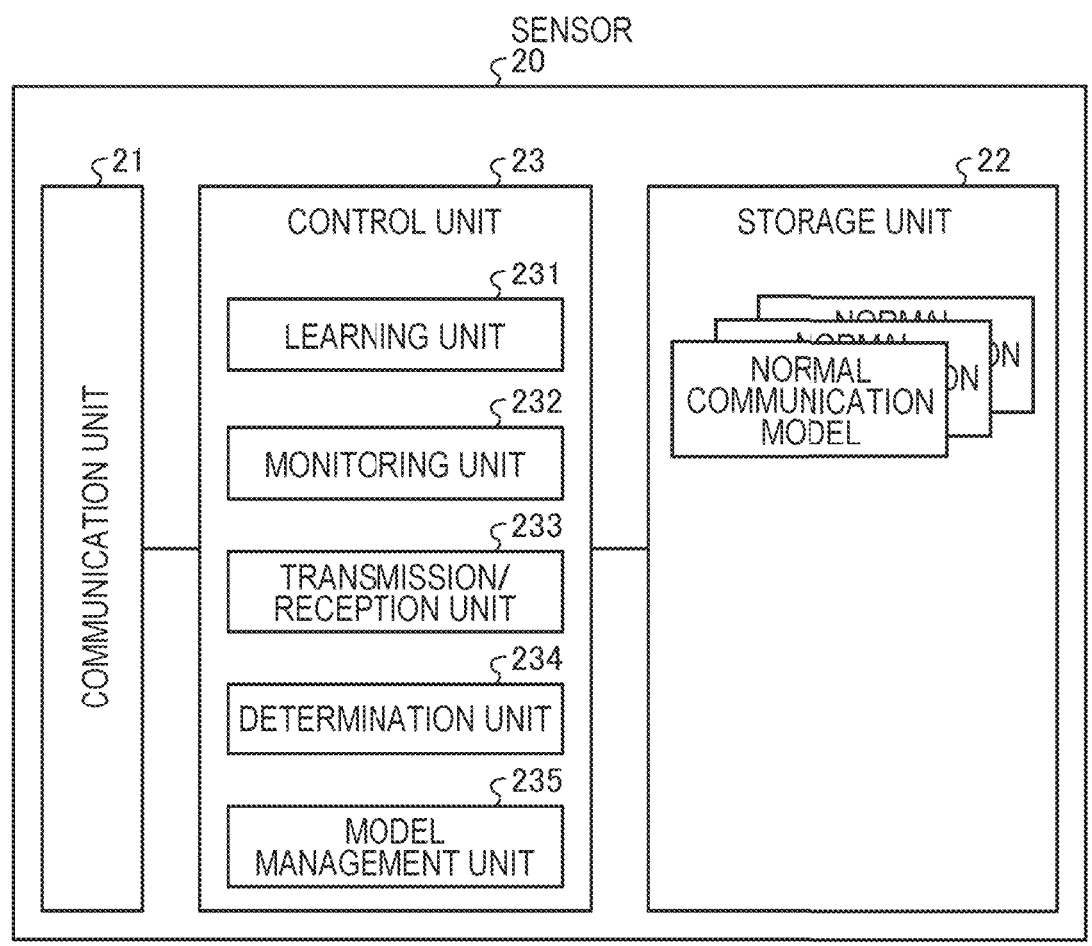
FIG. 3 illustrates a configuration example of a sensor.

The description returns to FIG. 3. The monitoring unit 232 monitors the communication of the IoT device to be monitored by using the normal communication model or the average model in the storage unit 22. For example, the monitoring unit 232 monitors whether or not the communication of the IoT device to be monitored is normal communication by using the normal communication model. Note that the monitoring unit 232 may monitor the communication of the IoT device by using a combination of the normal communication model and an abnormal communication model (model indicating a characteristic of abnormal communication).

The transmission/reception unit 233 transmits and receives various pieces of data to and from the server 100. For example, in a case where the learning unit 231 learns a new normal communication model or in a case where the parameter of the normal communication model is updated, the transmission/reception unit 233 transmits the new normal communication model or the normal communication model whose parameter has been updated to the server 100.

In a case where the learning unit 231 fails in learning the normal communication model, the transmission/reception unit 233 transmits information indicating the failure in learning the normal communication model to the server 100. The information indicates, for example, which model of the IoT device the learning unit 231 has failed in learning the normal communication model of which feature.

The transmission/reception unit 233 receives, from the server 100, notification of whether or not the normal communication model currently applied to its sensor 20 belongs to the majority cluster (the attribution information to the majority cluster). The transmission/reception unit 233 also receives an average model of a normal communication model group belonging to the majority cluster from the server 100.

The determination unit 234 determines whether to change the normal communication model currently applied to its sensor 20 on the basis of the attribution information to the majority cluster received from the server 100.

For example, the determination unit 234 determines to apply the normal communication model currently applied as it is in a case where the attribution information indicates that the normal communication model learned by its sensor 20 (i.e. the normal communication model currently applied) belongs to the majority cluster.

Meanwhile, for example, in a case where the attribution information indicates that the normal communication model currently applied does not belong to the majority cluster, the determination unit updates the normal communication model or applies the average model received from the server 100. Whether to update the normal communication model or apply the average model is determined based on, for example, an instruction input by an administrator or the like of the sensor 20.

The model management unit 235 manages the normal communication model applied in the monitoring unit 232. For example, in a case where the administrator or the like of the sensor 20 inputs an instruction to update the normal communication model via the communication unit 21, the model management unit 235 causes the learning unit 231 to relearn the normal communication model. Then, the model management unit 235 changes the normal communication model applied in the monitoring unit 232 to the relearned normal communication model.

Further, for example, in a case where the administrator or the like of the sensor 20 inputs an instruction to apply the average model of the normal communication model via the communication unit 21, the model management unit 235 changes the normal communication model applied in the monitoring unit 232 to the average model.

[Success and Failure in Learning] Success and failure in learning a normal communication model in the learning unit 231 will be described with reference to FIG. 5. There will be described an example where a feature used to learn the normal communication model is the number of destination IP addresses for each certain time period in communication of the IoT device. Description will be made on the assumption that values of the feature have a normal distribution in the learned normal communication model.

For example, the learning unit 231 is connected to the IoT device of the model A ((1): Device connection) and learns a normal communication model on the basis of the feature of the communication data of the IoT device ((2): Learning). In a case where a value of the number of cumulative destination IP addresses for each certain time period in the communication of the IoT device fits a fitting curve in (2), for example, the learning unit 231 can generate a normal communication model ((3): Generation of normal communication model). That is, the learning unit 231 succeeds in learning the normal communication model.

Figure 5:
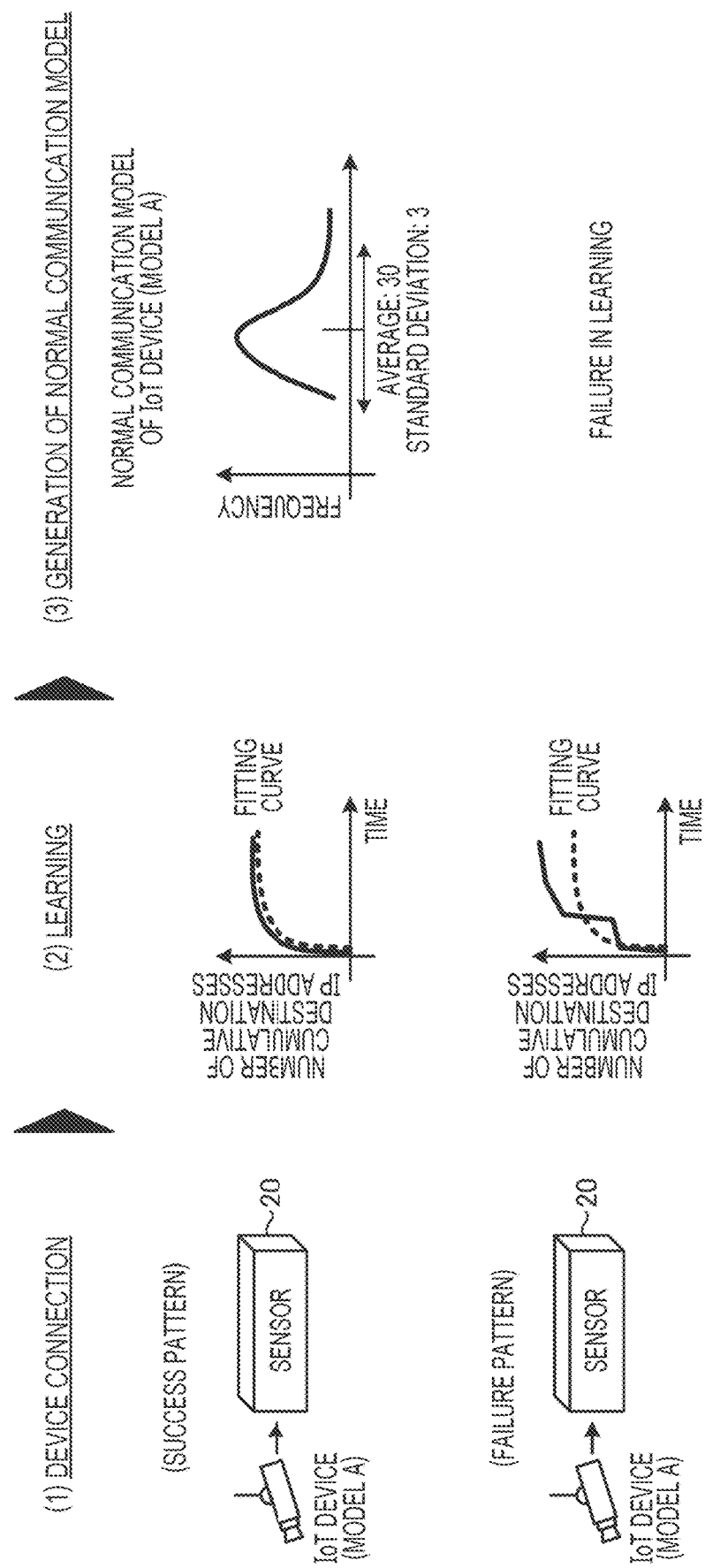
FIG. 5 is an explanatory diagram of success and failure in learning a normal communication model.

Meanwhile, in a case where the value of the number of cumulative destination IP addresses for each certain time period in the communication of the IoT device does not fit the fitting curve in (2) of FIG. 5, for example, the learning unit 231 cannot generate a normal communication model. That is, the learning unit 231 fails in learning the normal communication model.

[Example of Processing Procedure]

[Overview] Next, an example of a processing procedure of the system 1 will be described. The processing procedure of the system 1 is divided into (1) a learning phase and (2) an operation phase. (1) The learning phase is, for example, a phase in which a new sensor 20 is added to the system 1 and a normal communication model learned in the sensor 20 is added to the server 100. (2) The operation phase is a phase in which the normal communication model is updated in the existing sensor 20 in the system 1 and the updated normal communication model is added to the server 100.

Figure 6:
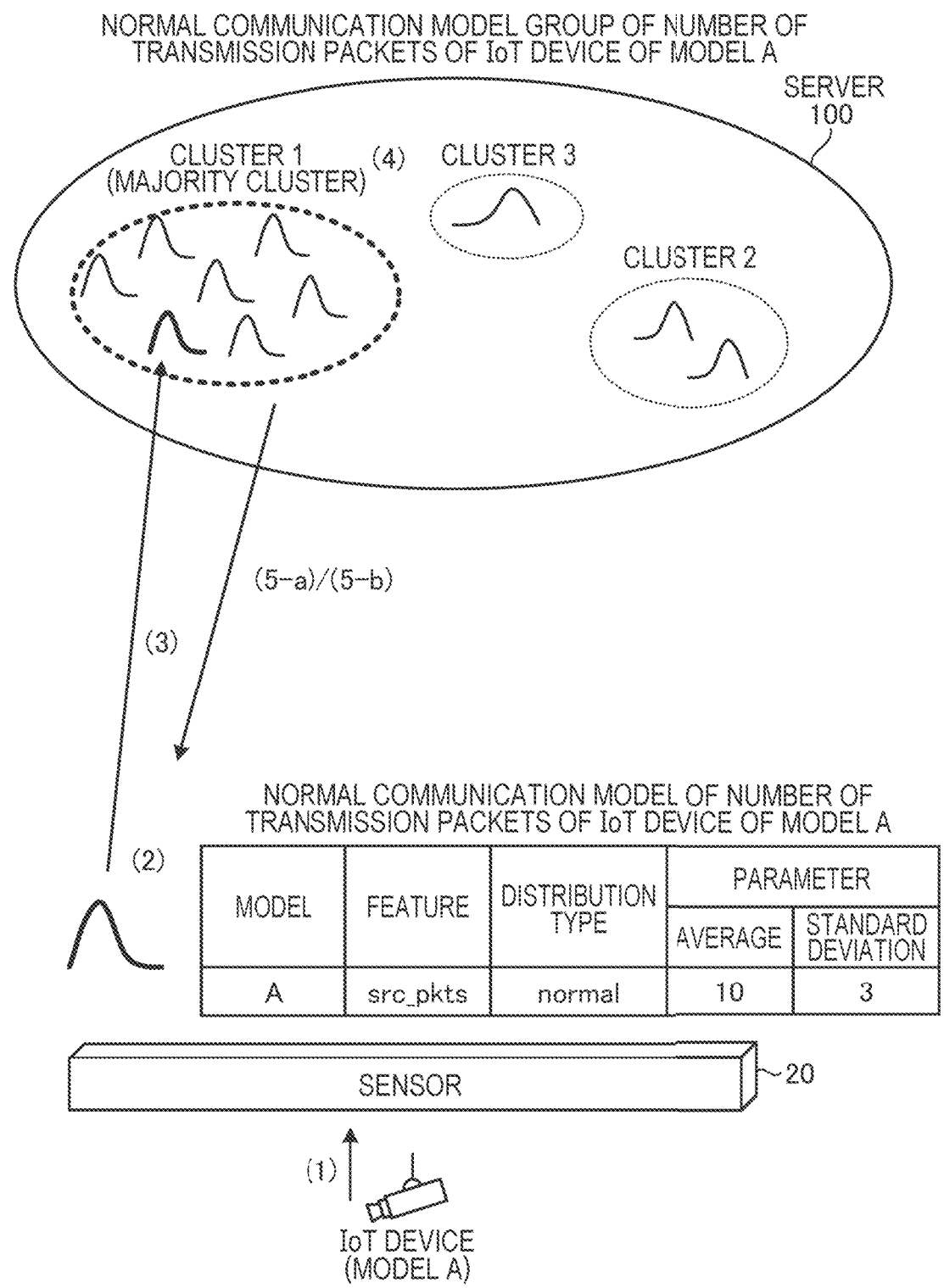
FIG. 6 is an explanatory diagram of an example of a processing procedure in a learning phase of a system in a case where a sensor succeeds in learning a normal communication model.

[Learning Phase (in a case of succeeding in learning normal communication model)] First, an example of the processing procedure of the system 1 in (1) the learning phase will be described with reference to FIG. 6. An example of the processing procedure of the system 1 in a case where the sensor 20 succeeds in learning a normal communication model will be described.

(1) The sensor 20 acquires communication data of the IoT device (IoT device of the model A).

(2) The sensor 20 performs statistical processing of a feature of the acquired communication data, thereby learning a normal communication model of the number of transmission packets of the IoT device of the model A.

(3) When succeeding in learning the normal communication model, the sensor 20 transmits the learned normal communication model (model to be determined) to the server 100.

(4) The server 100 clusters a normal communication model group including the model to be determined transmitted from the sensor 20, the normal communication model group having the number of transmission packets of the IoT device of the model A. Then, the server 100 calculates a majority cluster by using a result of the clustering and calculates an average model of the normal communication model group belonging to the majority cluster.

(5) The server 100 notifies the sensor 20 of the following contents according to the result of the clustering of the normal communication model group.

(5-a) In a case where the server 100 determines that the model to be determined belongs to the majority cluster, the server notifies the sensor 20 serving as an acquisition source of the model to be determined of attribution information indicating that the model to be determined belongs to the majority cluster. The server 100 also notifies the sensor 20 of the average model of the majority cluster.

Therefore, the administrator of the sensor 20 can confirm that there is no problem in applying the normal communication model learned by the sensor 20.

(5-b) In a case where the server 100 determines that the model to be determined does not belong to the majority cluster, the server notifies the sensor 20 serving as the acquisition source of the model to be determined of attribution information indicating that the model to be determined does not belong to the majority cluster.

Therefore, the administrator of the sensor 20 can know whether or not the normal communication model learned by the sensor 20 is appropriate. In a case where the normal communication model learned by the sensor 20 is not appropriate, the sensor 20 can acquire an appropriate normal communication model (average model).

Figure 7:
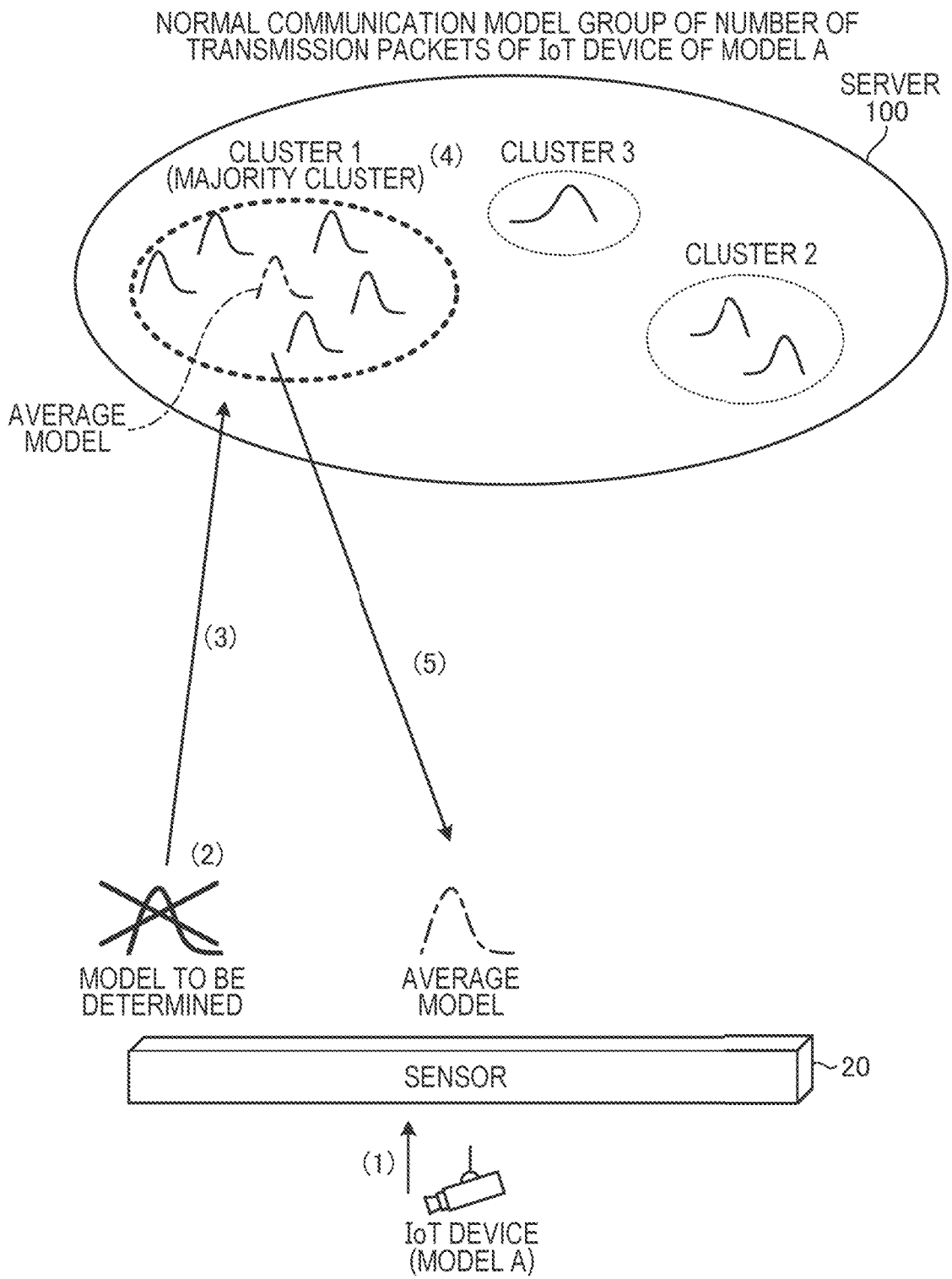
FIG. 7 is an explanatory diagram of an example of a processing procedure in a learning phase of a system in a case where a sensor fails in learning a normal communication model.

[Learning Phase (in a case of failing in normal communication model)] Next, an example of the processing procedure of the system 1 in a case where the sensor 20 fails in learning a normal communication model in (1) the learning phase will be described with reference to FIG. 7.

(1) The sensor 20 acquires communication data of the IoT device (IoT device of the model A).
(2) The sensor 20 performs statistical processing of a feature of the acquired communication data, thereby learning a normal communication model of the number of transmission packets of the IoT device of the model A.
(3) In a case where the sensor 20 fails in learning the normal communication model, the sensor transmits information indicating the failure in learning the normal communication model to the server 100. The information indicates, for example, that the sensor has failed in learning the normal communication model of the number of transmission packets of the IoT device of the model A.
(4) The server 100 clusters a normal communication model group of the number of transmission packets of the IoT device of the model A, calculates a majority cluster by using a result of the clustering, and calculates an average model of the normal communication model group belonging to the majority cluster.
(5) The server 100 transmits the average model calculated in (4) to the sensor 20. Therefore, even in a case where the sensor 20 fails in learning the normal communication model, the sensor 20 can acquire an appropriate normal communication model (average model).

Figure 8:
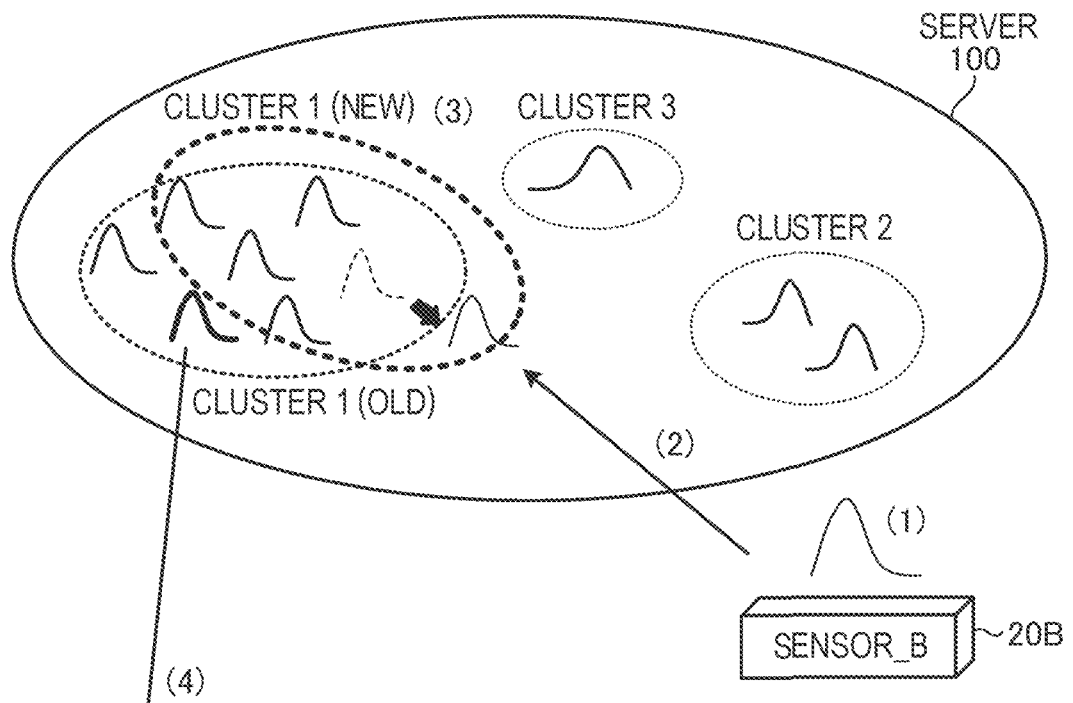
FIG. 8 is an explanatory diagram of an example of a processing procedure in an operation phase of a system.

[Operation Phase] Next, an example of the processing procedure of the system 1 in (2) the operation phase will be described with reference to FIG. 8. There will be described an example where a sensor 20B in FIG. 8 updates a parameter of a normal communication model of the number of transmission packets of the IoT device of the model A.

(1) The sensor 20B updates the parameter of the normal communication model of the number of transmission packets of the IoT device of the model A.
(2) The sensor 20B transmits the updated normal communication model to the server 100.
(3) The server 100 clusters again a normal communication model group including the updated normal communication model transmitted from the sensor 20B, the normal communication model group having the number of transmission packets of the IoT device of the model A. Further, the server 100 recalculates a majority cluster by using a result of the clustering and recalculates an average model of the normal communication model group belonging to the majority cluster.
(4) In a case where there is a normal communication model that is out of the majority cluster as a result of the recalculation of the majority cluster, the server 100 notifies the sensor 20 (e.g. a sensor 20A) serving as an acquisition source of the normal communication model that the normal communication model is out of the majority cluster. The server 100 also notifies the sensor 20 (e.g. the sensor 20A) serving as the acquisition source of the normal communication model of the calculated average model of the majority cluster. Note that the notification that the normal communication model is out of the majority cluster may include information indicating how far the normal communication model deviates from the majority cluster.

Therefore, the administrator of the sensor 20 can know whether or not the normal communication model learned by the sensor 20 is no longer appropriate. In a case where the normal communication model learned by the sensor 20 is no longer appropriate, it is possible to acquire an appropriate normal communication model (average model).

[Example of Processing Procedure]

Figure 9:
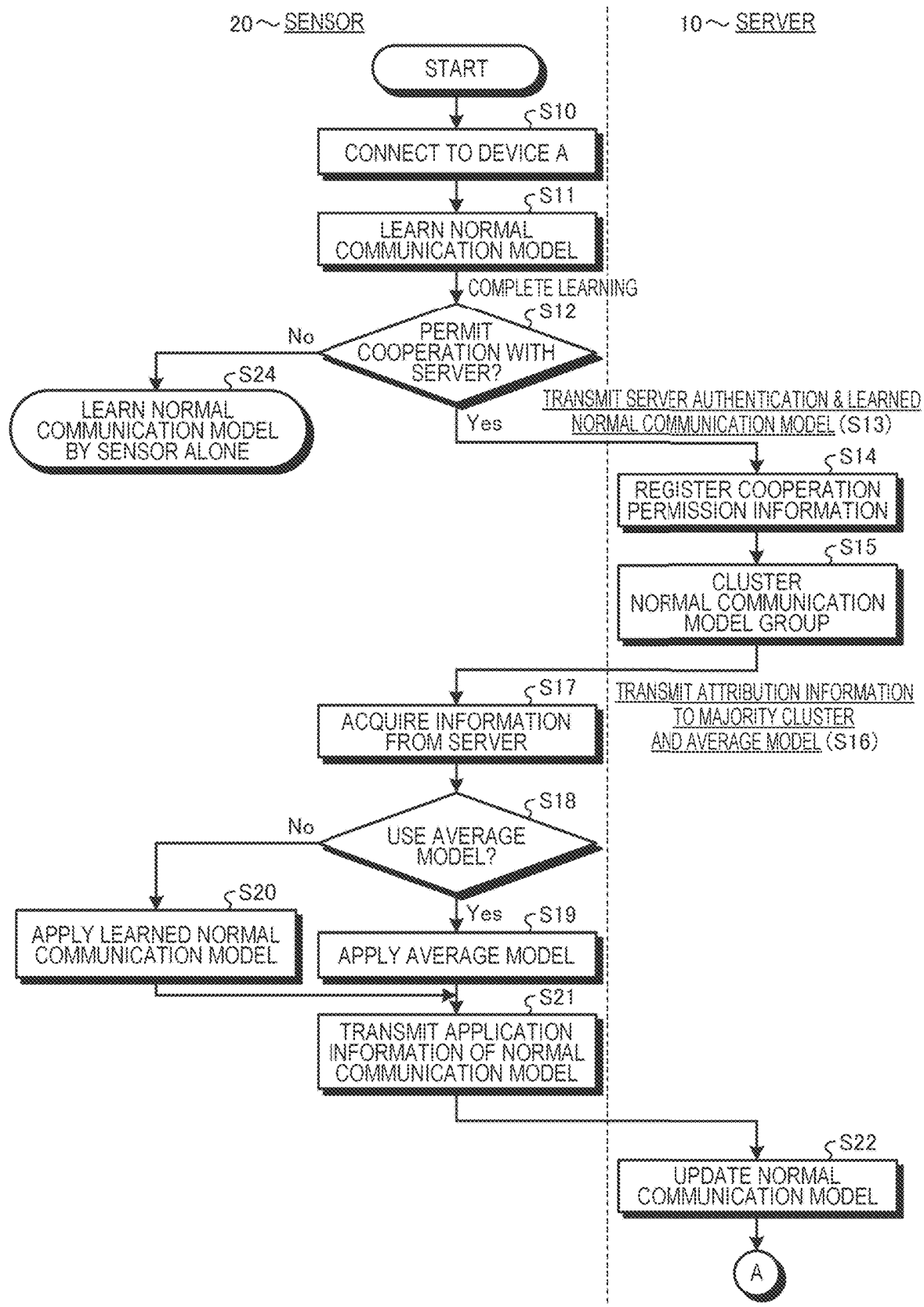
FIG. 9 is an explanatory diagram of an example of a processing procedure in a learning phase of a system in a case where a sensor succeeds in learning a normal communication model.
Figure 10:
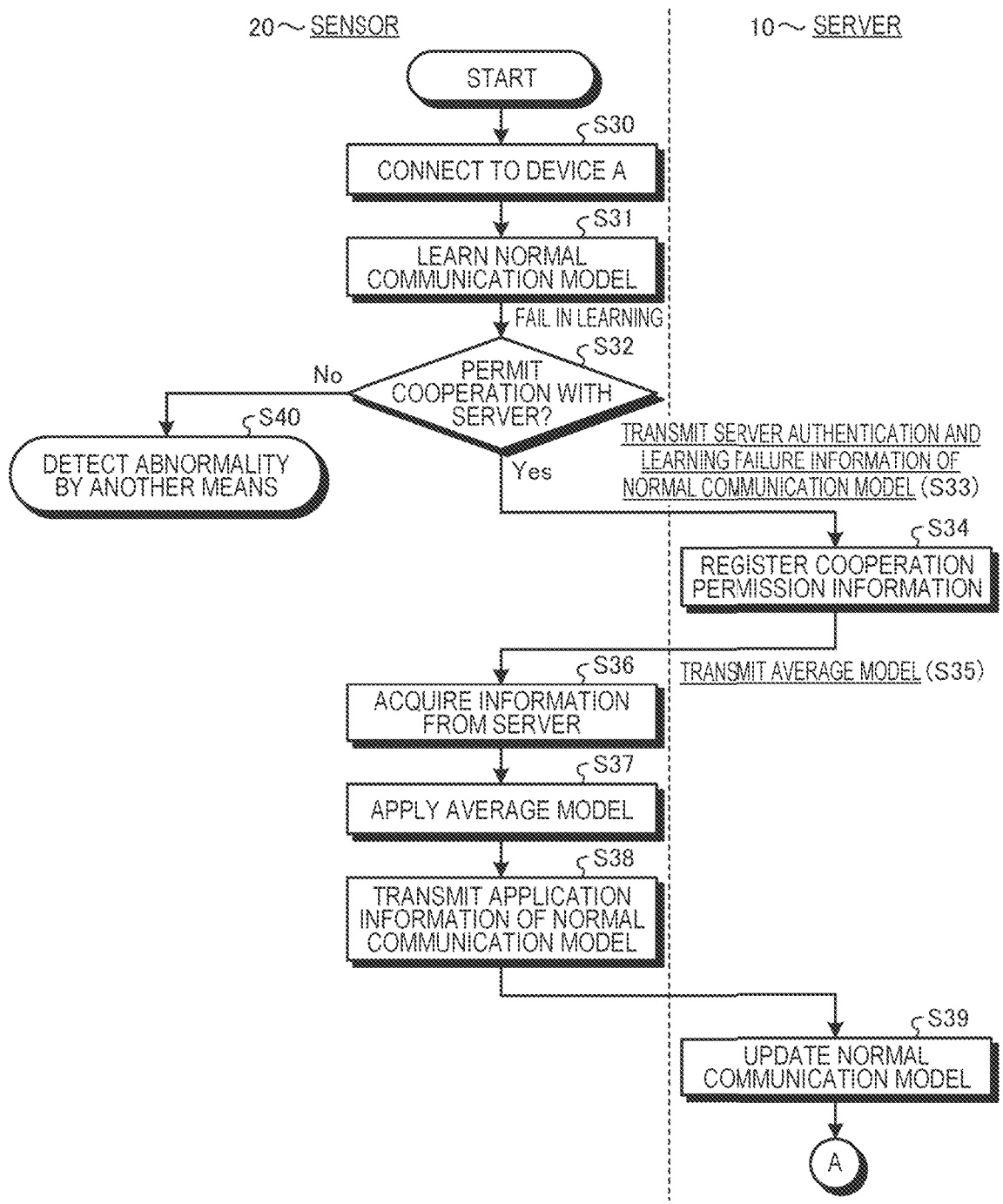
FIG. 10 is an explanatory diagram of an example of a processing procedure in a learning phase of a system in a case where a sensor fails in learning a normal communication model.
Figure 11:
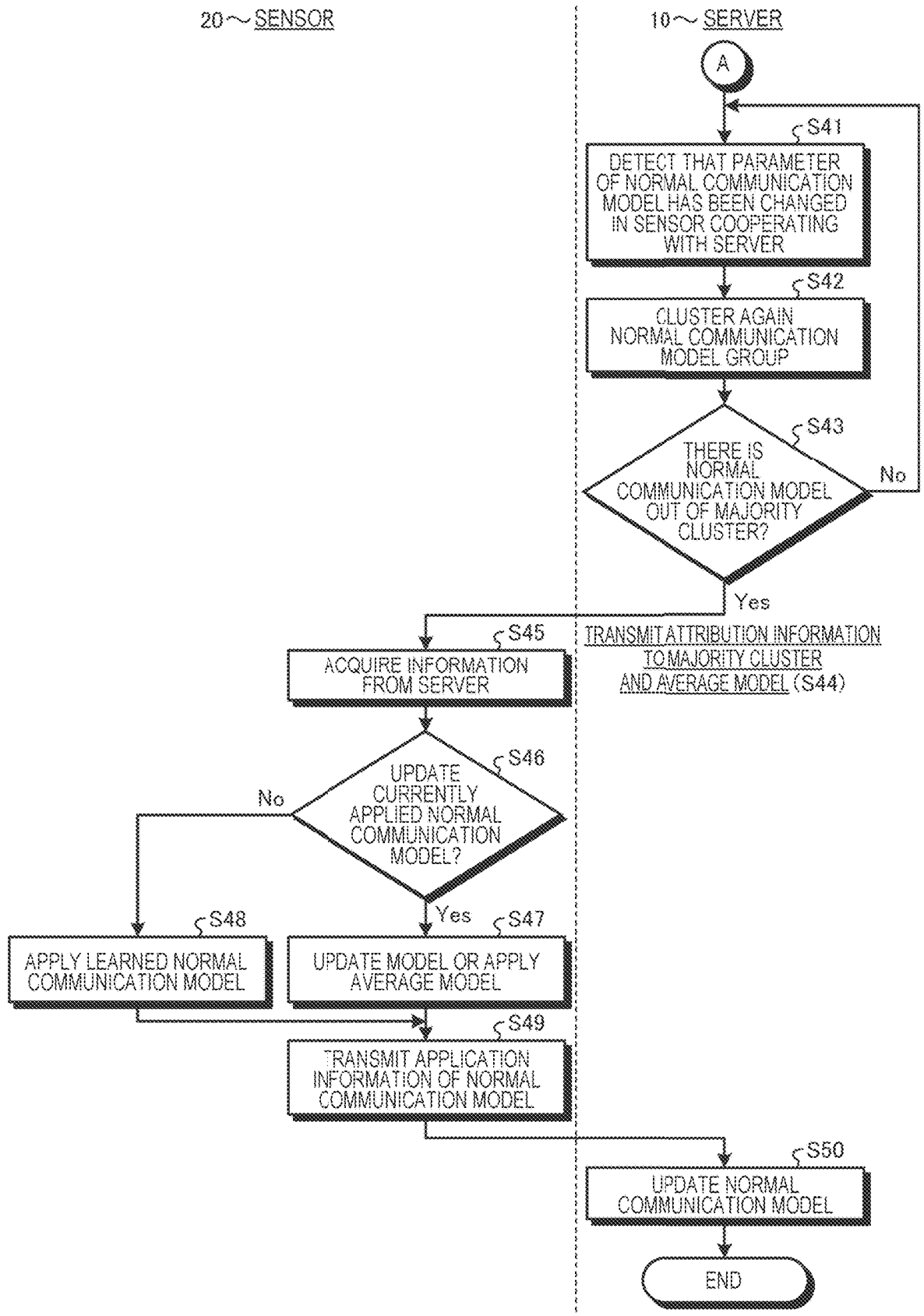
FIG. 11 is an explanatory diagram of a processing procedure in an operation phase of a system.

[Details] Next, an example of the processing procedure of the system 1 will be described in detail with reference to FIGS. 9, 10, and 11.

[Learning Phase (in a case of succeeding in learning normal communication model)] An example of the processing procedure in the learning phase in a case where the sensor 20 succeeds in learning a normal communication model will be described with reference to FIG. 9.

First, when the sensor 20 is connected to a device A (IoT device to be monitored) (S10), the learning unit 231 learns a normal communication model (S11). When completing the learning of the normal communication model, the sensor 20 determines whether to permit cooperation with the server 100 (S12). For example, when receiving an input indicating that cooperation with the server 100 is permitted from the administrator of the sensor 20, the sensor 20 determines to permit cooperation with the server 100 (Yes in S12). Then, the transmission/reception unit 233 of the sensor 20 transmits authentication information of the server 100 and the normal communication model learned in S11 to the server 100 (S13).

Meanwhile, for example, when the sensor 20 does not receive the input indicating that cooperation with the server 100 is permitted from the administrator of the sensor 20, the sensor determines not to permit cooperation with the server 100 (No in S12). In this case, for example, the learning unit 231 of the sensor 20 learns the normal communication model by the sensor 20 alone (S24).

After S13, when receiving the authentication information of the server and the normal communication model from the sensor 20, the acquisition unit 131 of the server 100 registers cooperation permission information of the sensor 20 in the storage unit 120 (S14). Then, the calculation unit 132 of the server 100 clusters a normal communication model group including the normal communication model transmitted in S13 (S15). Further, the calculation unit 132 calculates a majority cluster by using a result of the clustering and calculates an average model of the majority cluster. Furthermore, the determination unit 133 determines whether or not the normal communication model transmitted in S13 belongs to the majority cluster.

After S15, the notification unit 134 of the server 100 transmits a result of the determination by the determination unit 133 (attribution information of the normal communication model to the majority cluster) and the average model to the sensor 20 that has transmitted the normal communication model in S13 (S16).

After S16, the transmission/reception unit 233 of the sensor 20 receives, from the server 100, the attribution information of the normal communication model transmitted in S13 to the majority cluster and the average model (S17: Acquire information from server). Thereafter, the determination unit 234 determines whether to use the average model on the basis of the attribution information to the majority cluster received in S17 (S18).

For example, when the attribution information to the majority cluster indicates that the normal communication model transmitted in S13 does not belong to the majority cluster, the determination unit 234 determines to use the average model (Yes in S18). Then, the model management unit 235 changes the normal communication model applied in the monitoring unit 232 to the average model (S19: Apply average model). Thereafter, the processing proceeds to S21.

Meanwhile, when the attribution information to the majority cluster indicates, for example, that the normal communication model belongs to the majority cluster, the determination unit 234 determines not to use the average model (No in S18). Then, the model management unit 235 applies the normal communication model learned in S11 as the normal communication model applied in the monitoring unit 232 (S20: Apply learned normal communication model). Thereafter, the processing proceeds to S21.

In S21, the transmission/reception unit 233 transmits application information of the normal communication model to the server 100 (S21). The application information of the normal communication model indicates, for example, whether the normal communication model learned by the sensor 20 or the average model is applied to the sensor 20. When applying the normal communication model learned by the sensor 20, the sensor 20 transmits the application information of the normal communication model including the learned normal communication model.

After S21, the acquisition unit 131 of the server 100 updates normal communication model information (information indicating the normal communication model applied by each sensor 20) in the storage unit 120 on the basis of the application information of the normal communication model transmitted from the sensor 20 in S21 (S22). Thereafter, the processing proceeds to S41 in FIG. 11. The processing in S41 of FIG. 11 will be described later.

Because the system 1 performs the above processing, the administrator of the sensor 20 can know whether or not the normal communication model learned by the sensor 20 is appropriate. In a case where the normal communication model learned by the sensor 20 is not appropriate, it is possible to acquire an appropriate normal communication model (average model).

[Learning Phase (in a case of failing in learning normal communication model)] Next, an example of the processing procedure in the learning phase in a case where the sensor 20 fails in learning a normal communication model will be described with reference to FIG. 10.

First, when the sensor 20 is connected to the device A (IoT device to be monitored) (S30), the learning unit 231 learns a normal communication model (S31). When failing in learning the normal communication model, the sensor 20 determines whether to permit cooperation with the server 100 (S32). For example, when receiving an input indicating that cooperation with the server 100 is permitted from the administrator of the sensor 20, the sensor 20 determines to permit cooperation with the server 100 (Yes in S32).

Then, the transmission/reception unit 233 of the sensor 20 transmits authentication information of the server 100 and learning failure information of the normal communication model (information indicating the failure in learning the normal communication model) to the server 100 (S33). As described above, the learning failure information of the normal communication model indicates which model of the IoT device the learning unit has failed in learning the normal communication model of which feature.

Meanwhile, for example, when the sensor 20 does not receive the input indicating that cooperation with the server 100 is permitted from the administrator of the sensor 20, the sensor determines not to permit cooperation with the server 100 (No in S32). Then, the sensor 20 detects abnormality of the IoT device by another means, for example (S40).

After S33, when receiving the authentication information of the server and the normal communication model from the sensor 20, the acquisition unit 131 of the server 100 registers cooperation permission information of the sensor 20 in the storage unit 120 (S34). Thereafter, the notification unit 134 reads, from the storage unit 120, an average model of the normal communication model of a model and feature indicated in the learning failure information of the normal communication model and transmits the average model to the sensor 20 (S35).

After S35, the transmission/reception unit 233 of the sensor 20 receives the average model from the server 100 (S36: Acquire information from server). Thereafter, the model management unit 235 applies the average model received in S36 as the normal communication model used in the monitoring unit 232 (S37). Then, the transmission/reception unit 233 transmits application information of the normal communication model to the server 100 (S38).

After S38, the acquisition unit 131 of the server 100 updates the normal communication model information in the storage unit 120 on the basis of the application information of the normal communication model transmitted from the sensor 20 in S38 (S39). Thereafter, the processing proceeds to S41 in FIG. 11. The processing in S41 of FIG. 11 will be described later.

Because the system 1 performs the above processing, it is possible to acquire an appropriate normal communication model (average model) even in a case where the sensor 20 fails in learning the normal communication model.

[Operation Phase] An example of the processing procedure in the operation phase will be described with reference to FIG. 11. First, when the server 100 detects that a parameter of a normal communication model has been changed in the sensor 20 cooperating with the server (S41), the calculation unit 132 clusters a normal communication model group again (S42).

For example, in a case where the acquisition unit 131 of the server 100 receives a normal communication model whose parameter has been updated from any one of the sensors 20, the calculation unit 132 clusters again a normal communication model group including the updated normal communication model, the normal communication model group having the same model and the same feature as the updated normal communication model. Then, the calculation unit 132 recalculates a majority cluster by using a result of the clustering. The calculation unit 132 also recalculates an average model of the majority cluster.

After S42, the determination unit 133 of the server 100 determines whether or not there is a normal communication model that is out of the majority cluster as a result of the processing in S42 (S43). When the determination unit 133 determines that there is no normal communication model that is out of the majority cluster (No in S43), the processing returns to S41.

Meanwhile, when the determination unit 133 determines that there is a normal communication model that is out of the majority cluster (Yes in S43), the notification unit 134 transmits attribution information to the majority cluster and the average model to the sensor 20 that has transmitted the normal communication model that is out of the majority cluster (S44). Thereafter, the processing proceeds to S45.

Note that the attribution information to the majority cluster transmitted in S44 indicates that the normal communication model applied in the sensor 20 is out of the majority cluster. Further, the attribution information to the majority cluster may include a value indicating how far the normal communication model deviates from the majority cluster. The processing in S45 to S50 is similar to the processing in S17 to S22 of FIG. 9, and thus description thereof is omitted.

Because the system 1 performs the above processing, the administrator of the sensor 20 can know whether or not the normal communication model learned by the sensor 20 is no longer appropriate. In a case where the normal communication model learned by the sensor 20 is no longer appropriate, the sensor 20 can acquire an appropriate normal communication model (average model).

[Other Embodiments] In the above embodiment, the server 100 notifies the sensor 20 serving as an acquisition source of a normal communication model of attribution information to a majority cluster and an average model, regardless of whether or not the normal communication model belongs to the majority cluster. However, the present invention is not limited thereto.

For example, the notification unit 134 of the server 100 may notify the sensor 20 serving as an acquisition source of a normal communication model belonging to the majority cluster of the attribution information to the majority cluster and may notify the sensor 20 serving as an acquisition source of a normal communication model not belonging to the majority cluster of the attribution information to the majority cluster and the average model. That is, the notification unit 134 of the server 100 may not notify the sensor 20 serving as the acquisition source of the normal communication model belonging to the majority cluster of the average model.

The notification unit 134 of the server 100 notifies the sensor 20 of the attribution information to the majority cluster, but the present invention is not limited thereto. For example, in a case where the normal communication model learned by the sensor 20 belongs to the majority cluster, the notification unit 134 may notify the sensor 20 that there is no problem in applying the normal communication model, whereas, in a case where the normal communication model does not belong to the majority cluster, the notification unit 134 may notify the sensor that it is necessary to relearn or update the normal communication model.

[System Configuration and Others] Each component of each unit illustrated in the drawings is functionally conceptual and does not necessarily need to be physically configured as illustrated in the drawings. That is, a specific form of distribution and integration of individual devices is not limited to the illustrated form, and all or part thereof can be functionally or physically distributed and integrated in any unit according to various loads, usage conditions, and the like. Further, all or any part of each processing function performed in each device can be implemented by a CPU and a program executed by the CPU or can be implemented as hardware by wired logic.

In the processing described in the above embodiment, all or part of processing described as being automatically performed may be manually performed, or all or part of processing described as being manually performed may be automatically performed by a known method. In addition, the processing procedure, control procedure, specific names, and information including various pieces of data and parameters in the above description or the drawings can be arbitrarily changed, unless otherwise specified.

[Program] The server 100 can be implemented by installing a program in a desired computer as packaged software or online software. It is possible to cause, for example, an information processing device to execute the program, thereby causing the information processing device to function as the server 100. The information processing device herein includes a desktop or laptop personal computer. In addition, the information processing device also includes mobile communication terminals such as a smartphone, a mobile phone, and a personal handy-phone system (PHS) and terminals such as a personal digital assistant (PDA).

In a case where a terminal device used by a user is implemented as a client, the server 100 can be implemented as a server device that provides a service regarding the above processing for the client. In this case, the server device may be implemented as a web server or may be implemented as a cloud that provides a service regarding the above processing by outsourcing.

Figure 12:
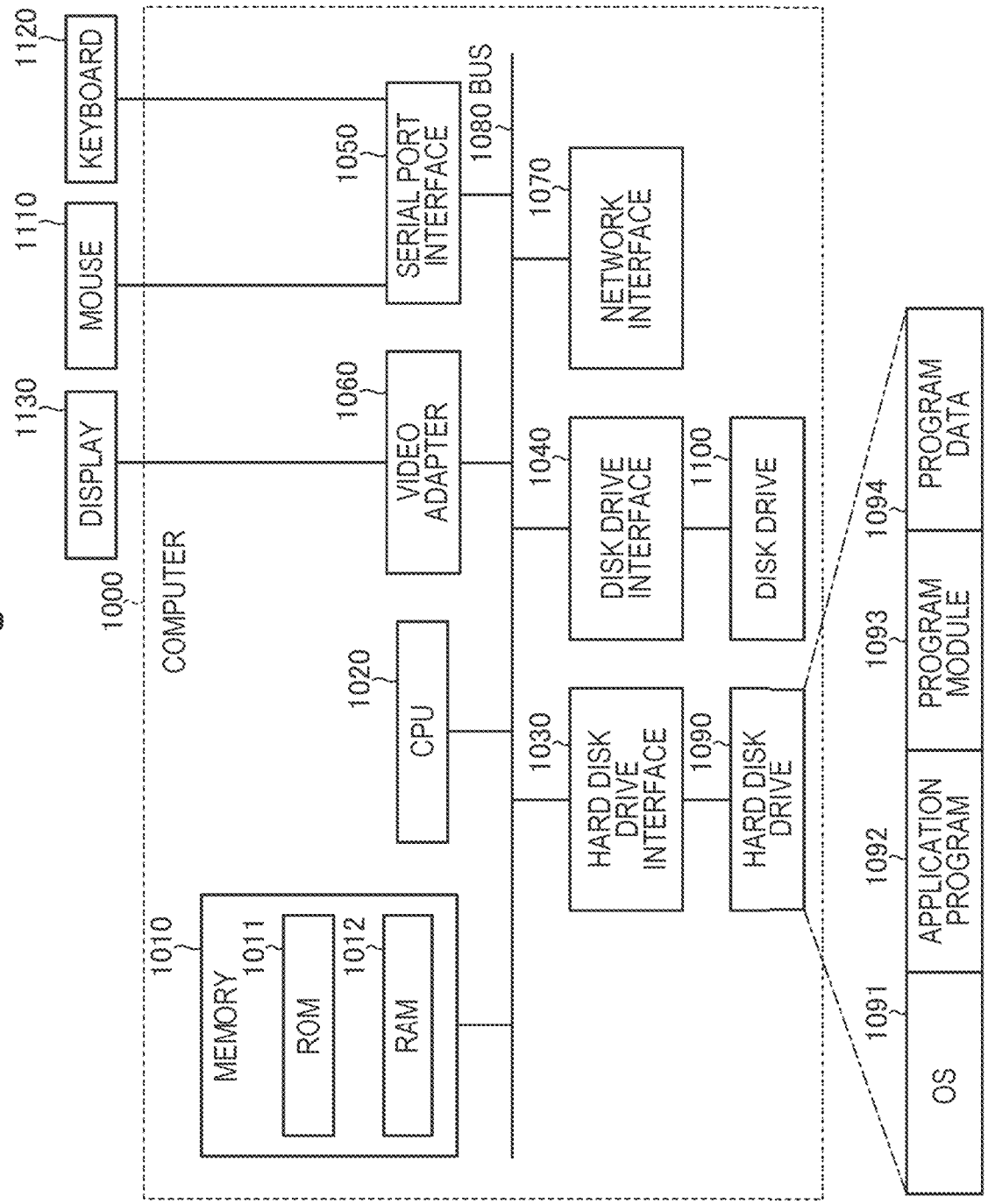
FIG. 12 illustrates a configuration example of a computer that executes an analysis program.

FIG. 12 illustrates an example of a computer that executes an analysis program. The computer 1000 includes, for example, a memory 1010 and a CPU 1020. The computer 1000 further includes a hard disk drive interface 1030, a disk drive interface 1040, a serial port interface 1050, a video adapter 1060, and a network interface 1070. Those units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, a program that defines each processing executed by the server 100 is implemented as the program module 1093 in which a code executable by the computer is written. The program module 1093 is stored in, for example, the hard disk drive 1090. For example, the program module 1093 for executing processing similar to that of the functional configuration in the server 100 is stored in the hard disk drive 1090. Note that the hard disk drive 1090 may be replaced with a solid state drive (SSD).

Data used in the processing of the above embodiments is stored in, for example, the memory 1010 or the hard disk drive 1090 as the program data 1094. Then, the CPU 1020 reads the program module 1093 and the program data 1094 stored in the memory 1010 and the hard disk drive 1090 to the RAM 1012 as necessary and executes the program module and the program data.

Note that the program module 1093 and the program data 1094 are not limited to being stored in the hard disk drive 1090 and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

REFERENCE SIGNS LIST

1 System
20 Sensor
21, 110 Communication unit
22, 120 Storage unit
23, 130 Control unit
100 Server
131 Acquisition unit
132 Calculation unit
133, 234 Determination unit
134 Notification unit
231 Learning unit 232 Monitoring unit
233 Transmission/reception unit
235 Model management unit

The invention claimed is:

1. An analysis device comprising:
processing circuitry configured to:
obtain normal communications models from a plurality of network traffic sensors respectively corresponding to a plurality of Internet of Things (IoT) devices, a respective network traffic sensor monitoring communications of a corresponding IoT device, and a respective normal communications model (i) being used to monitor the communications of the corresponding IoT device and (ii) indicating a characteristic of normal communications of the corresponding IoT device;
identify, from the obtained normal communications models, normal communications models that share a communications feature;
cluster the identified normal communications models that share the communications feature to generate a plurality of clusters of normal communications models;
determine a majority cluster having a largest number of normal communications models using a result of the clustering;
generate an average model of the normal communications models belonging to the majority cluster; and
notify the respective network traffic sensor of (i) attribution information indicating whether the respective normal communications model belongs to the majority cluster and (ii) the average model.

2. The analysis device according to claim 1, wherein the processing circuitry is further configured to:
notify the respective network traffic sensor belonging to the majority cluster of the attribution information, and
notify the respective network traffic sensor not belonging to the majority cluster of the attribution information and the average model.

3. The analysis device according to claim 1, wherein the processing circuitry is further configured to:
in a case where a normal communications model whose parameter has been updated from the respective network traffic sensor is obtained,
identify, from the obtained normal communications models including the normal communications model whose parameter has been updated, the normal communications models that share the communications feature,
cluster again the identified normal communications models that share the communications feature to regenerate the plurality of clusters of normal communications models,
redetermine the majority cluster, and
regenerate the average model of the normal communications models belonging to the redetermined majority cluster, and
in a case where any one of the normal communications models is out of the redetermined majority cluster,
notify the respective network traffic sensor serving as an acquisition source of the normal communications model that is out of the redetermined majority cluster of the attribution information indicating that the respective normal communications model is out of the redetermined majority cluster and the regenerated average model.

4. The analysis device according to claim 1, wherein
in a case where notification indicating a failure in learning the respective normal communications model of the corresponding IoT device is obtained from the respective network traffic sensor,
notify the respective network traffic sensor of an average model of normal communications models belonging to one of the plurality of clusters having a same communications feature as the respective normal communications model whose learning has failed.

5. The analysis device according to claim 1, wherein the communications feature includes at least one of a number of transmission packets per certain time period, a number of destination IP addresses, a destination port number, or a number of bytes of packets in the communication of the IoT device.

6. An analysis method executed by an analysis device, the analysis method comprising:
obtaining normal communications models from a plurality of network traffic sensors respectively corresponding to a plurality of Internet of Things (IoT) devices, a respective network traffic sensor monitoring communications of a corresponding IoT device, and a respective normal communications model (i) being used to monitor the communications of the corresponding IoT device and (ii) indicating a characteristic of normal communications of the corresponding IoT device;
identifying, from the obtained normal communications models, normal communications models that share a communications feature;
clustering the identified normal communications models that share the communications feature to generate a plurality of clusters of normal communications models;
determining a majority cluster having a largest number of normal communications models using a result of the clustering;
generating an average model of the normal communications models belonging to the majority cluster; and
notifying the respective network traffic sensor of (i) attribution information indicating whether the respective normal communications model belongs to the majority cluster and (ii) the average model.

7. A non-transitory computer-readable recording medium storing therein an analysis program that causes a computer to execute a process comprising:
obtaining normal communications models from a plurality of network traffic sensors respectively corresponding to a plurality of Internet of Things (IoT) devices, a respective network traffic sensor monitoring communications of a corresponding IoT device, and a respective normal communications model (i) being used to monitor the communications of the corresponding IoT device and (ii) indicating a characteristic of normal communications of the corresponding IoT device;
identifying, from the obtained normal communications models, normal communications models that share a communications feature;
clustering the identified normal communications models that share the communications feature to generate a plurality of clusters of normal communications models;
determining a majority cluster having a largest number of normal communications models using a result of the clustering;
generating an average model of the normal communications models belonging to the majority cluster; and notifying the respective network traffic sensor of (i) attribution information indicating whether the respective normal communications model belongs to the majority cluster and (ii) the average model.

\* \* \* \* \*

UNITED STATES PATENT AND TRADEMARK OFFICE
CERTIFICATE OF CORRECTION

| | |
|---|---|
| PATENT NO. | : 12,438,787 B2 |
| APPLICATION NO. | : 18/276644 |
| DATED | : October 7, 2025 |
| INVENTOR(S) | : Takahiro Nukushina et al. |

Page 1 of 1

It is certified that error appears in the above-identified patent and that said Letters Patent is hereby corrected as shown below:

On the Title Page

Item (71) Applicant: the Applicant name should be corrected from "NTT, INC." to --NTT, Inc.--

Signed and Sealed this
Twenty-third Day of December, 2025

John A. Squires
*Director of the United States Patent and Trademark Office*